United States Patent [19]

Marshall

[11] Patent Number: 4,853,882
[45] Date of Patent: Aug. 1, 1989

[54] SYSTEM AND METHOD FOR PROTECTING AGAINST REDUNDANT MAILINGS

[75] Inventor: Robert Marshall, El Paso, Tex.

[73] Assignee: A. C. Nielsen Company, Northbrook, Ill.

[21] Appl. No.: 115,698

[22] Filed: Nov. 2, 1987

[51] Int. Cl.4 .......................... G06F 15/21; G06F 7/20
[52] U.S. Cl. ..................................... 364/570; 235/375; 340/825.3; 364/401
[58] Field of Search ........... 364/400, 401, 407, 464.01, 364/200, 900, 570; 235/375; 340/825.3, 825.34

[56] References Cited

U.S. PATENT DOCUMENTS

| | | | |
|---|---|---|---|
| 4,166,540 | 9/1979 | Marshall | 235/375 |
| 4,450,535 | 5/1984 | de Pommery et al. | 364/900 |
| 4,674,041 | 6/1987 | Lemon et al. | 364/400 |
| 4,750,119 | 6/1988 | Cohen et al. | 364/401 |
| 4,752,675 | 6/1988 | Zetmeir | 235/375 |

Primary Examiner—Parshotam S. Lall
Assistant Examiner—Kevin Teska

[57] ABSTRACT

A system and method for protecting against redundant mailings compile mail listings associated with, for example, refund promotion requests received during a given period of time for a number of different refund promotions. Each listing in the compilation is compared on an automated basis with one or more other listings in the compilation according to one or more rules defining a first statistically significant event to identify suspicious listings. Listings in the compilation are also compared on an automated basis to listings previously identified as suspicious and may also be compared to listings associated with known abusers and complainers. Listings identified as suspicious are thereafter compared on an automated basis according to one or more different rules defining a second statistically significant event to identify redundant mailings.

55 Claims, 8 Drawing Sheets

|  | 1 | 2 | 3 | 4 | 5 |
|---|---|---|---|---|---|
| ZIP | X | X | X | X | X |
| ALPHA ST. | X |  | X | X |  |
| NUMERIC ST. |  | X | X | X |  |
| ALPHA SURNAME |  |  | X | X |  |

FIG. 3B

| RULE | 1 | 2 | 3 | --- | N |
|---|---|---|---|---|---|
| 1 | AS-70% | AS-90% | AS-80% |  | AS-100% |
| 2 | 2/3 |  | 1/2 |  | ALL SAME |
| 3 | 60% | 60% | 70% |  |  |
| 4 | 50% |  | 50% |  |  |
| 5 | S-80% | S-90% | S-80% |  | S-80% |
| # OF RULES FOR REJ. | 3/5 | 3/3 | 4/5 |  | 2/3 |

| Rule No. | % Surname Characters in Common | % Street Alpha Characters in Common | Common Street Alphas Included | First 3 Characters of Street Alpha Must Match | Rule Weight | Matching Street Numeric Position and Digit Value for Address with | | | | | |
|---|---|---|---|---|---|---|---|---|---|---|---|
| | | | | | | 1 NO. | 2 NOS. | 3 NOS. | 4 NOS. | 5 NOS. | 5+ NOS. |
| 1 | 60 | 50 | YES | YES | 10 | NO TEST | | | | | |
| 2 | 0 | 0 | NO | YES | 2 | NO TEST | | | | | |
| 3 | 0 | 80 | YES | NO | 10 | 1 | 2 | 2 | 3 | 4 | 4 |
| 4 | 0 | 70 | YES | NO | 8 | 0 | 2 | 3 | 4 | 4 | 4 |
| 5 | 70 | 40 | YES | NO | 8 | 1 | 2 | 3 | 4 | 4 | 4 |
| 6 | 0 | 90 | NO | NO | 10 | NO TEST | | | | | |
| 7 | 0 | 0 | YES | NO | 9 | 0 | 0 | 0 | 4 | 4 | 4 |
| 8 | 0 | 70 | YES | NO | 1 | 1 | 1 | 2 | 3 | 4 | 4 |
| 9 | 70 | 40 | YES | NO | 1 | 1 | 1 | 1 | 1 | 1 | 1 |
| 10 | 80 | 0 | YES | NO | 8 | NO TEST | | | | | |

SYSTEM AND METHOD FOR PROTECTING AGAINST REDUNDANT MAILINGS

TECHNICAL FIELD

The present invention relates to a mailing list purifying system and method for protecting against redundant mailings to a person based on a mailing list on which the person's listing appears more than once with slight variations therein; and more particularly, to such a system and method for implementing a soft checking scheme which utilizes various rules and rule combinations defining statistically significant events to identify suspicious listings and from those, multiple listings for one person.

BACKGROUND OF THE INVENTION

Various types of consumer refund promotions are run by manufacturers nationwide to encourage the purchase of products. In particular, such promotions are used to develop brand loyalty by requiring multiple purchases of the same product by one person. One type of promotion is a print promotion in which a refund offer and form are provided in a newspaper or magazine. In another type of promotion, the refund offer and form are attached to the product's package or inserted therein. Still another type of refund promotion is a Point-of-Sale promotion in which a pad of refund forms is provided in the store preferably adjacent to the product which is the subject of the promotion. Each of these types of promotions typically requires proof that actual purchases of the product have been made in order to obtain the refund. Further, the promotions are typically limited to one refund per person or household.

In order to provide the required proof of purchase necessary for the refund, the consumer must exert some effort, such as by peeling or soaking off labels. Often the effort results in a torn or partially destroyed label. Because of this, most manufacturers are willing to take only a portion of a label as proof of purchase. Further, in promotions involving canned products, the consumer is often asked to submit a number, such as the batch number, marked on the can as proof of purchase. These numbers, however, cannot easily be checked, so that almost any number is often accepted as proof of purchase. Because manufacturers are lenient on the proof of purchase requirements, consumer refund promotions are open to fraud. One of the worst abuses occurs when a would-be cheater goes to a store or stores and steals the entire pad of refund forms used in a Point-of-Sale promotion. This act not only facilitates fraudulent refund requests but also denies honest consumers the opportunity to use the refund request forms.

Known systems used to catch fraudulent refund requests have focused on the name of the person to whom the refund is to be made and the address listed on the refund form to which the refund is to be mailed. One such system is commonly known as a "dupe-checking" system which requires a hard or identical match of characters in the names and addresses of persons requesting refunds for a single promotion. More particularly, this type of system checks a mail list comprised of the names and addresses of each person requesting a refund for one promotion over a given period of time to determine whether there are duplicate listings. Duplicate listings are detected when the system determines that the characters in certain positions in two or more listings match. For example, one system may require that the characters in the first, third, sixth and eighth positions of the names of two listings match identically and that the characters in the first, second, fourth and seventh positions of the addresses of the two listings match identically for the listings to be identified as duplicates. The refund requests associated with each listing identified as a duplicate usually are then denied. These systems typically base refund rejections on only one set of character positions with a minimal number of positions contained therein. This is because of the heavy and expensive data processing involved in matching the requisite characters in each listing with the characters in all of the other listings. Further, to ensure that honest refund requests are not denied, the minimal number of positions in the character position set employed in known "dupe-checking" systems is often quite large. It has been found, however, that the greater the number of positions in the character position set, the easier it is to avoid detection by such a system. Computers have even been used by cheaters in the past to generate multiple mail listings with slight variations therein to avoid detection by known "dupe-checking" systems, wherein the variations are such that a postman is still able to deliver the refunds to the cheaters.

SUMMARY OF THE INVENTION

In accordance with the present invention, the disadvantages of prior refund reimbursement monitoring systems have been overcome. The system and method of the present invention reduce the possibility of redundant mailings to a person based on a mailing list in which the person's listing appears more than once with slight variations therein by employing a soft checking scheme which uses a number of different comparison rules and rule combinations defining statistically significant events to identify multiple listings for one person.

The system of the present invention is a two-tier system. The system first identifies suspicious listings from a mailing list according to a rule or rules defining a first statistically significant event. Thereafter, the system analyzes each listing identified to be suspicious according to a different rule or rules defining a second statistically significant event to identify multiple listings for one person. The two-tier system of the present invention employing soft checking is believed to be much more efficient than known "dupe-checking" systems, the processing time necessary to identify redundant listings having been reduced. The system is, however, also believed to be much more effective in identifying redundant listings than known "dupe-checking" systems because more redundant listings are likely to be caught by the system of the present invention than by known systems.

The system and method of the present invention may be used to monitor refund promotions to identify and deny multiple refund requests made by one person or one household. When used to monitor refund requests, the system identifies suspicious listings by comparing listings associated with refund requests received during a given time period for both the same and different promotions. Because each listing is compared to listings for different promotions, a greater number of suspicious listings is identified to aid the system in catching more redundant listings. Further, in order to catch an even greater number of suspicious listings, each listing or portion thereof may be compared to a file containing the listings of known refund promotion abusers (and possibly, also known complainers) as well as to a history file containing listings previously identified as suspicious.

The system of the present invention further allows listings which are identified as suspicious but not automatically rejected to be displayed and/or printed at an auditor's station with those listings of particular interest being highlighted for subsequent review by personnel to identify fraudulent schemes that would otherwise go undetected.

The system and method of the present invention not only save the costs of redundant refunds, but also serve as a deterent. Would-be cheaters knowing that a refund promotion will be monitored according to the present invention will be detered from submitting fraudulent, multiple refund requests since they know it is likely that they will be caught by the system.

These and other objects, advantages and novel features of the present invention, as well as details of an illustrative embodiment thereof, will be more fully understood from the following description and from the drawing.

BRIEF DESCRIPTION OF THE DRAWING

FIG. 5, comprising FIGS. 5A and 5B, is a listing rejection routine employing serial rules;

DETAILED DESCRIPTION

Figure 1:
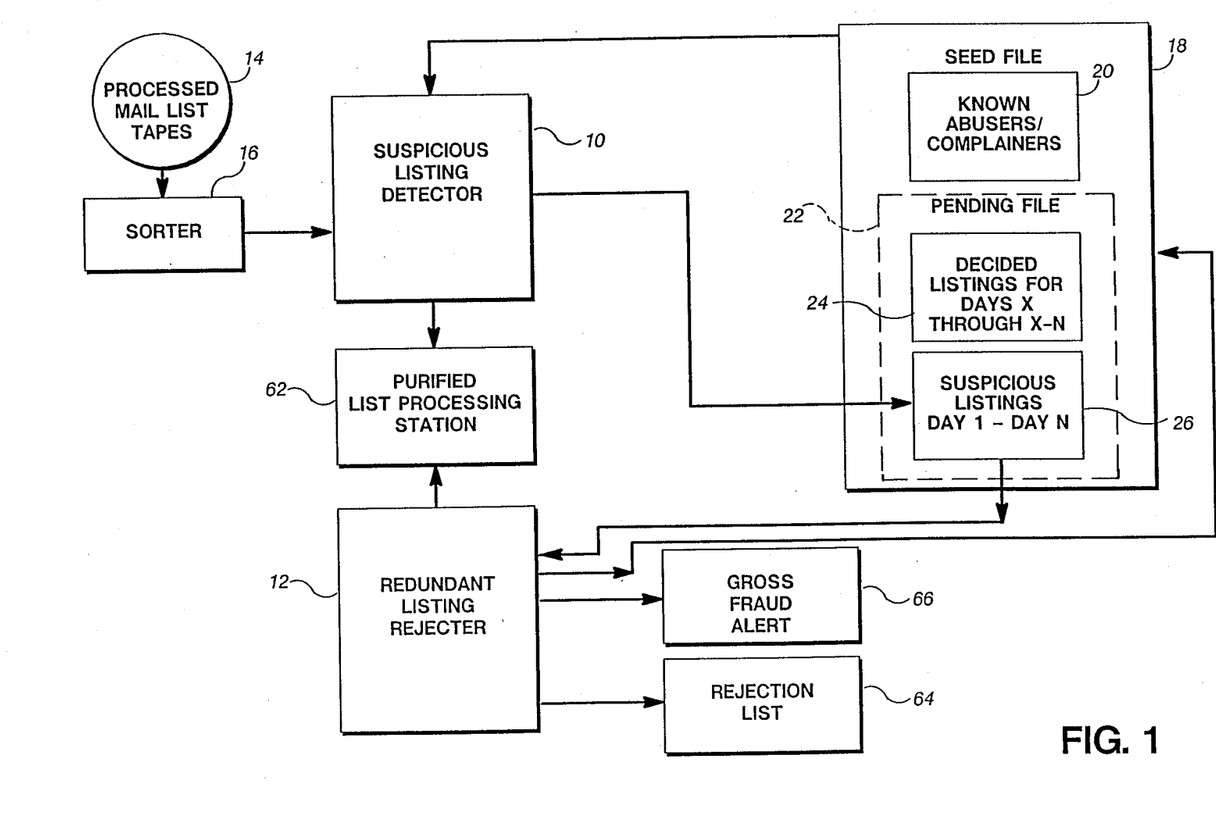
FIG. 1 is a block diagram of the system of the present invention for reducing the possibility of redundant mailings.

The system of the present invention as shown in FIG. 1 is a two-tier system having a detector 10 for identifying suspicious listings according to a rule or rules defining a first statistically significant event and having a rejector 12 for analyzing the listings identified as suspicious by the detector 10 to identify multiple listings for one person according to a different rule or rules defining a second statistically significant event. Although the system will be described in detail for a refund promotion monitoring system, it may be used to purify any mailing list and reduce the instances of redundant mailings to thereby reduce the costs associated therewith. For example, the system of the present invention might be used to prevent multiple copies of advertising from being sent to the same person or household. The system might also be used to consolidate mailings such as where different items are to be sent to one or more persons residing at the same address.

As shown in FIG. 1, processed mail list tapes 14 are presorted by a sorter 16 before being applied to the detector 10. When the system is used to monitor refund promotions, the mail list tapes 14 contain the listings associated with all refund requests received for a number of different refund promotions during a given period of time. The time period during which the listings are compiled onto the tapes is selected so that when the rule or rules employed by the detector 10 are applied to the compiled listings, the rules define a statistically significant event. For example, the time period during which the listings are compiled and applied to the detector 10 may be one day and the rule or rules applied may include the following. One rule applied by the detector 10 may require a match between the first three letters of a surname of one listing and the first three letters of a surname of a second listing having the same Zip Code as the first listing. Another rule applied by the detector 10 may require a match between particular digits in the numeric portions of the street addresses of a first listing and a second listing having the same zip code. In regard to the latter rule, for multiple digit street address listings, a match of the leading or most significant digits of the numeric portion of the street address is significant because variations in the listings associated with multiple or redundant refund requests tend to occur in the trailing or least significant digits of the street address numerics. If a match according to the applicable rule or rules occurs between listings associated with refund requests received on the same day for the same or different promotions, it is treated as a statistically significant event.

The sorter 16 preferably sorts the listings contained on the tapes 14 according to Zip Code, if necessary, so that the listings may be more easily handled by the detector 10. Although a presort according to Zip Code is preferred, the sorter 16 may sort the mail listings according to any characteristic which allows the application of the rule or rules used by the detector 10 to be more easily accomplished.

The suspicious listing detector 10 compares each listing contained in the presorted list from the sorter 16 to other listings contained in the presorted list as well as to listings stored in a seed file 18 in order to identify those listings which are suspicious, i.e., those which might be redundant. Depending upon the rule or rules employed by the detector 10, the detector 10 might compare a listing to only one other listing in the presorted list as discussed below with reference to FIG. 4. Further, the detector 10 might compare only a portion of one listing, that portion forming a match code, to the match code portions of other listings.

The see file 18 includes a subfile 20 for storing the listings, or identifying match code portions thereof, for known refund promotion abusers or, possibly, complainers. The seed file 18 also includes a pending file 22 which provides a history of the listings identified as suspicious by the detector 10 over a period of time which is greater than the time period during which the listings are compiled on the tapes 14. For example, whereas the tapes 14 may be one day's compilation of mail listings, the pending file may be a compilation of listings identified as suspicious over a period of two weeks or ten working days. The pending file 22 includes two subfiles, a subfile 24 and a subfile 26. The subfile 24 contains those listings for days X through X-N which have been processed by the rejector 12, where X represents the total number of days for which a history is kept and N represents the number of days for which suspicious listings have been accumulated in the subfile 26 but not decided by the rejector 12. The subfile 24 may contain all listings identified as suspicious which have been processed by the rejector 12 or the subfile may contain only those listings that have actually been determined to be redundant by the rejector 12. The subfile 26 of the pending file 22 contains those listings that have been identified as suspicious by the detector 10 on days 1 through N but which have as yet to be sent to the rejector 12. The pending file 22 is a rolling file such that, when the suspicious listings for one day are loaded in the subfile 26, the listings already decided by the rejector 12 stored in the file 24 for the oldest day, are removed.

Although those listings identified as suspicious on any given day may be sent directly to the rejector 12, in the preferred embodiment, suspicious listings are accumulated in the file 26 for a number of days before the contents of the file is analyzed by the rejector. For example, the pending file 22 may contain data accumulated over two weeks of working days, i.e., ten days; and the suspicious listings might be accumulated for five working days before being applied to the rejector 12. In this case, on the first day of a period during which suspicious listings are to be accumulated, the subfile 26 will contain all of the listings identified as suspicious on that day, whereas the subfile 24 will contain those listings decided by the rejector 12 for the nine previous working days. On the next day, the subfile 26 will contain those listings identified by the detector 10 as suspicious in the last two days whereas the subfile 24 will contain those listings decided by the rejector 12 for the eight prior days. This process continues until the subfile 26 contains the suspicious listings identified by the detector 10 in the last five days and the subfile 24 contains those listings already decided by the rejector 12 for the preceding five days.

The suspicious listing detector 10 analyzes the presorted listings from the sorter 16 according to a rule or rules that define statistically significant events. For example, the detector 10 may operate according to one rule to identify suspicious listings by comparing the first three letters of the surname of a listing from the sorter 16 with the first three letters of the surnames of other listings from the sorter 16 or the seed file 18 that have the same Zip Code as the first listing. Such a match is considered to be a statistically significant event even if the matching listings are associated with refund requests for different promotions. In this example, the match code of each listing is formed from the first three letters in the surname of the listing plus the listing's Zip Code. The detector 10 may also operate according to another rule which, for example, might require the first three numerics of the street address of one listing to match the first three numerics of the street address of a second listing having the same Zip Code as the Zip Code of the first listing. This type of match is also considered a statistically significant event even if the matching listings are associated with refund requests for different promotions. In this latter example, the match code of each listing is formed from the first three numerics in the street address of the listing plus the listing's Zip Code. Various other rules may be applied by the detector 10, the above being only two examples which are in no way intended to be limiting. However, while would-be cheaters often make slight variations in the name or address to which the refund is to be sent, the Zip Code is rarely altered since it is much more difficult for a refund to reach its intended destination with the wrong Zip Code. For this reason, in the preferred embodiment, the detector 10 requires the matching of Zip Codes as well as the matching of other characters in a pair of listings.

The suspicious listing detector 10 may be a computer, microprocessor or the like programmed to apply one or more rules to the listings from the sorter 16 to identify those which are suspicious. For example, the detector 10 may be programmed to implement the suspicious listing sort routine illustrated in FIG. 4 wherein match codes formed of the first three letters of a listing's surname plus the listing's Zip Code are used.

Figure 4:
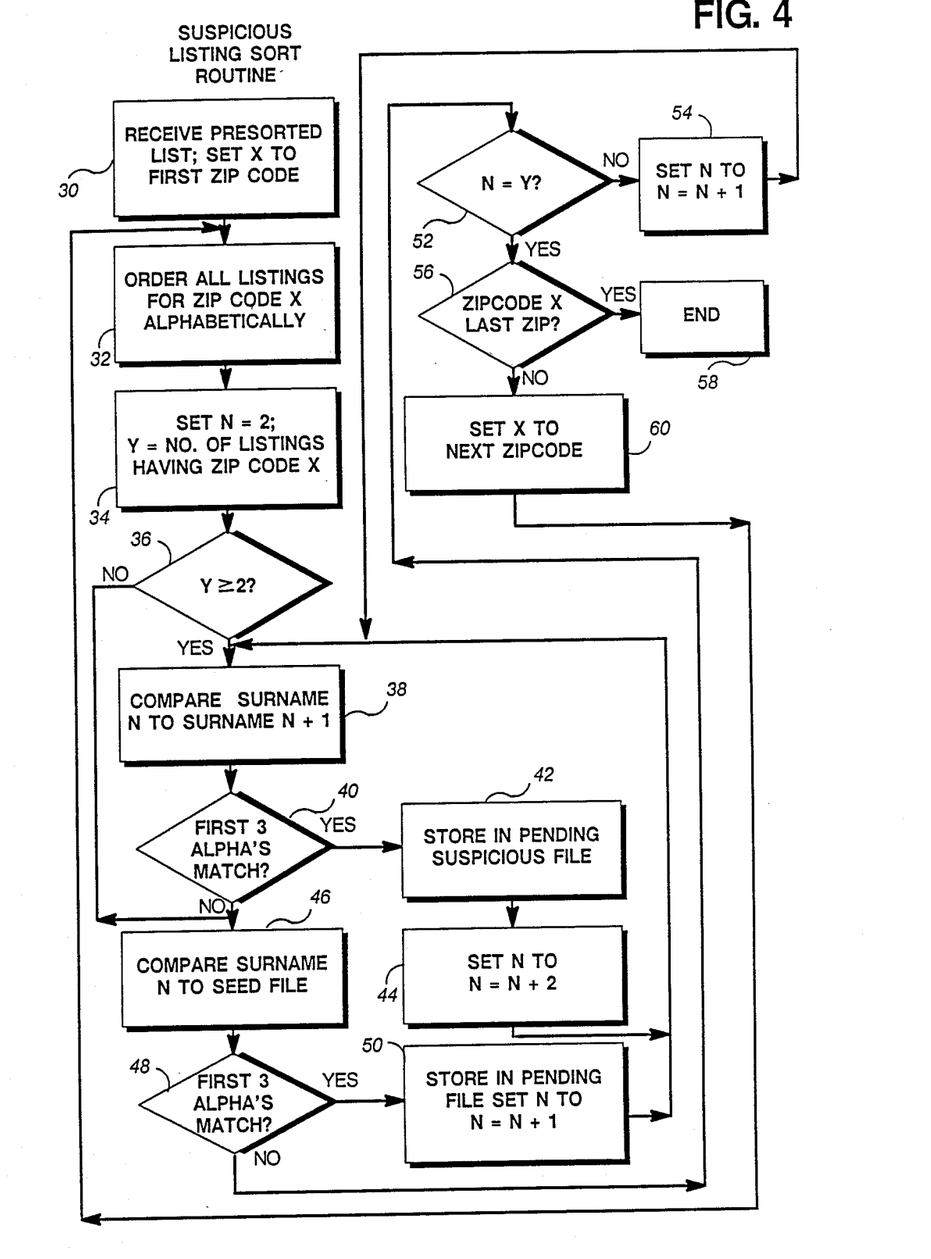
FIG. 4 is a flow chart illustrating a suspicious listing sorting routine employed by the detector shown in FIG. 1.

As shown in FIG. 4 the detector 10, at stage or block 30, receives the presorted list from the sorter 16 and sets a variable X to the first Zip Code in the list. The detector 10 at block 32 orders all of the listings having Zip Code X alphabetically so that each listing from the sorter 16 may be compared to only one other listing from the sorter. At block 34, the detector sets N equal to one and Y equal to the number of listings having Zip Code X. The detector at block 36 then determines whether there are two or more listings having the same Zip Code X and if there are, the detector proceeds to block 38 to compare the surname of the first listing (N=1) to the surname of the second listing (N+1=2). If the first three letters of the surnames match, as determined at block 40, the detector 10 at block 42 stores both the Nth and the (N+1)th listings in the suspicious listing pending subfile 26. Thereafter, at block 44, the detector 10 increments N to N=N+2 and returns to block 38 to compare the surnames of the next two listings. If the detector 10 determined at block 40 that the first three letters of the surnames of the first two listings do not match, the detector, at block 46, compares the first three letters of the surname for the first listing (N=1) to the first three letters of surnames for listings stored in the seed file 18 having the same Zip Code, Zip Code X. If the first three letters of the surname of the listing N match those of a listing stored in the seed file 18 as determined by the processor 10 at block 48, at block 50, the detector 10 stores the listing N in the subfile 26 and increments N to N=N+1. The detector 10 thereafter returns to block 38. If the first three letters of the surname of the Nth listing do not match any of those stored in the seed file 18, the processor at block 52 determines whether listing N was the last listing having a Zip Code X. If it was not, the detector at block 54 increments N to N=N+1 and returns to block 38. If the detector at block 52 determines that N is equal to Y, the detector at block 56 determines whether Zip Code X was the last Zip Code to be detected by the detector 10 and if it is, the routine ends at block 58. If listings remain with different Zip Codes, the Code and returns to block 32.

Listings output from the sorter 16 and identified by the detector 10 as suspicious are stored in the pending subfile 26 until a decision is made by the rejector 12 as to whether those suspicious listings are redundant. The listings from the output of the sorter 16 other than those identified as suspicious by the detector 10 are processed by a station 62 where a purified list is complied and refunds processed for mailing. Similarly, those listings identified by the detector 10 as suspicious but not rejected by the redundant listing rejector 12 are also applied to the station 62 so that refunds may be paid and mailed to the requester.

The redundant listing rejector 12 may include a computer, microprocessor or the like which is programmed to implement the rule or rules determined to identify statistically significant events which, in turn, identify redundant listings. This processor may be the same as used to carry out the functions of the detector 10, or it may be a different one. The redundant listing rejector 12 compiles a list 64 of rejected listings and also provides gross fraud alerts 66. The rejector 12 further updates the seed file 18 by storing in the subfile 24 those listings, or match codes, which have been found to be redundant and rejected.

Figure 2:
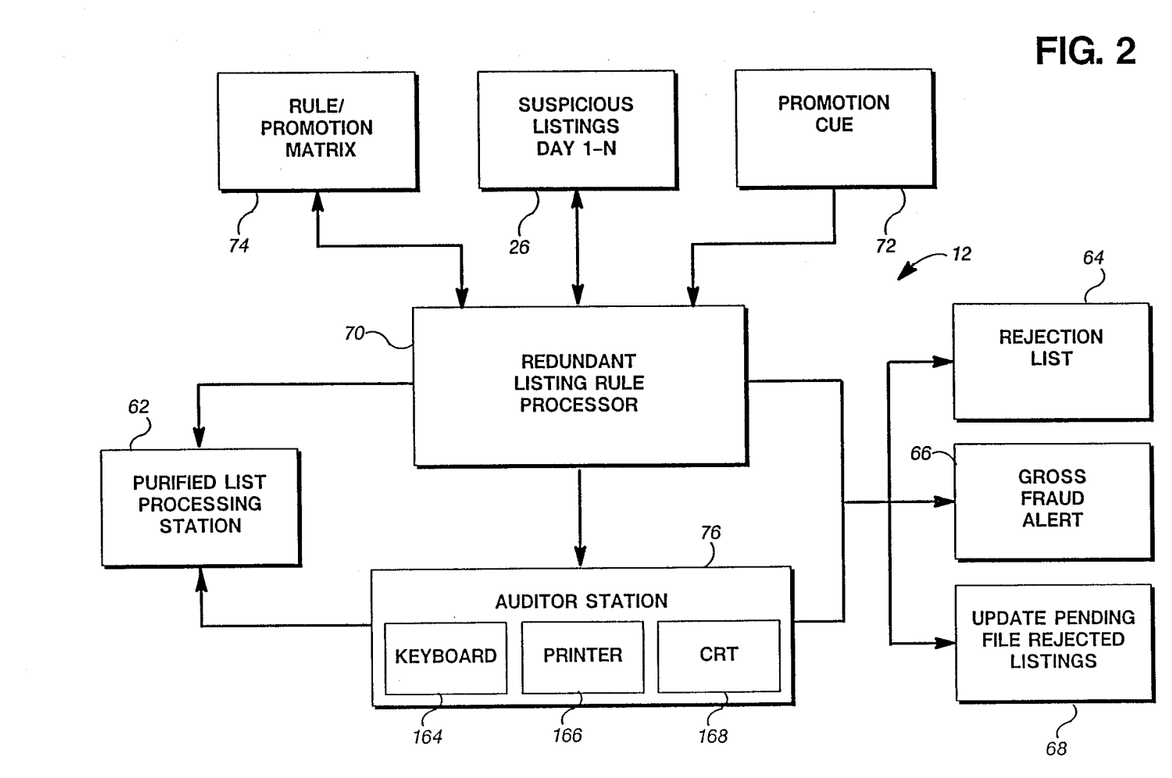
FIG. 2 is a block diagram of the redundant listing rejector shown in FIG. 1.

As shown in greater detail in FIG. 2, the redundant listing rejector 12 includes a processor 70 which analyzes suspicious listings for a single promotion as cued by a promotion cue 72 according to the previously selected rule or rules to be applied for that given promotion as identified by a rule/promotion matrix 74. If a suspicious listing is found to be redundant and rejected, the listing is added to the rejection list 64. If it is not found to be redundant by the processor 70, the listing may be coupled to an auditor's station 76 for further review as discussed below. If a suspicious listing is not rejected by either the processor 70 or at the station 76, the refund request associated with the listing is processed at the station 62 and the refund mailed out.

Figure 3A:
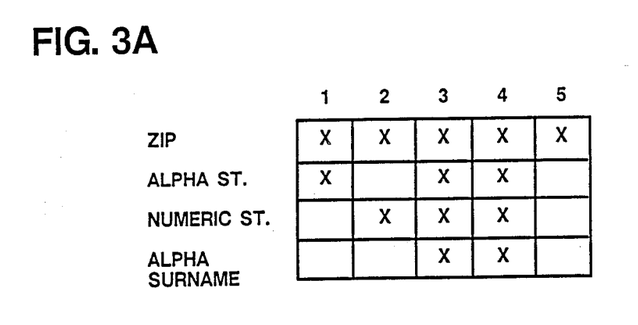
FIGS. 3a and 3b illustrate an example of a pair of rule matrices utilized by the redundant listing rejector shown in FIGS. 1 and 2.
Figure 3B:
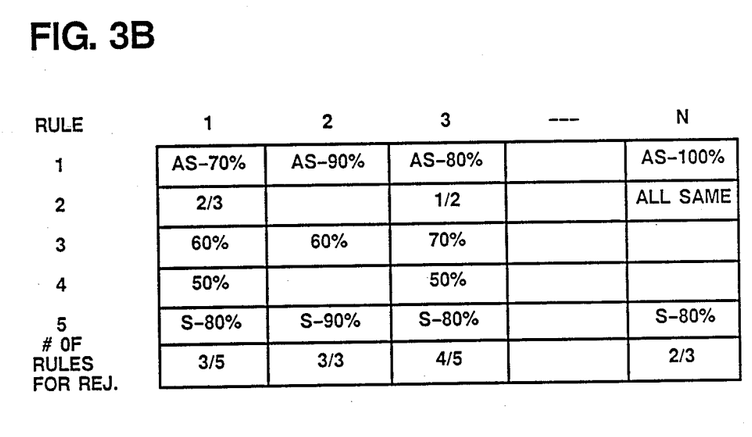

As shown in FIGS. 3a and 3b, the rule/promotion matrix 74 identifies the particular rules to be applied for a particular promotion. For example, as shown in FIG. 3a, rule 1 requires that the Zip Codes of two listings match and that a given percentage of the letters in the alpha portions of the listings' street addresses be in common for the rule to be satisfied. The given percentage is selectable for each promotion and may be, for example, 100%, 90%, 80% or 70%. It is noted for this rule the terms such as P.O. Box, R.R. or Rt., etc. are normally ignored. Rule 2 requires that the Zip Code of two listings match and that a given portion of the numeric part of their street addresses match. For example, a promotion might require a match between all of the numerics of the street addresses; a match between only one of the two first street numerics; a match between two of the first three street numerics; etc. Rule 3 requires that there be a given percentage of letters and numbers in the street address of a first listing in common with those in a second listing having the same Zip Code as the first listing. Whereas rule 4 requires that the Zip Codes of two listings match as well as requiring that a given percentage of letters and numbers in the listings' street addresses as well as letters in the surnames of the listings be in common. Finally, rule 5 requires that the Zip Codes of two listings match as well as there being a given percentage of common letters in the surnames of the two listings.

As shown in FIG. 3b, each promotion may utilize different rules with different variables being set for each rule. For example, promotion 1 requires that all five rules shown in FIG. 3a be applied with 70% of the letters in the street addresses in common for rule 1; two out of the first three numerics in the street addresses matching for rule 2; 60% of the entire street address, alpha and numeric portions thereof in common for rule 3; 50% of the street addresses and surnames in common for rule 4; and 80% of the letters in the surnames in common for rule 5. For a suspicious listing to be rejected by the processor 70, promotion 1 requires that three out of the five rules be satisfied.

Figure 5A:
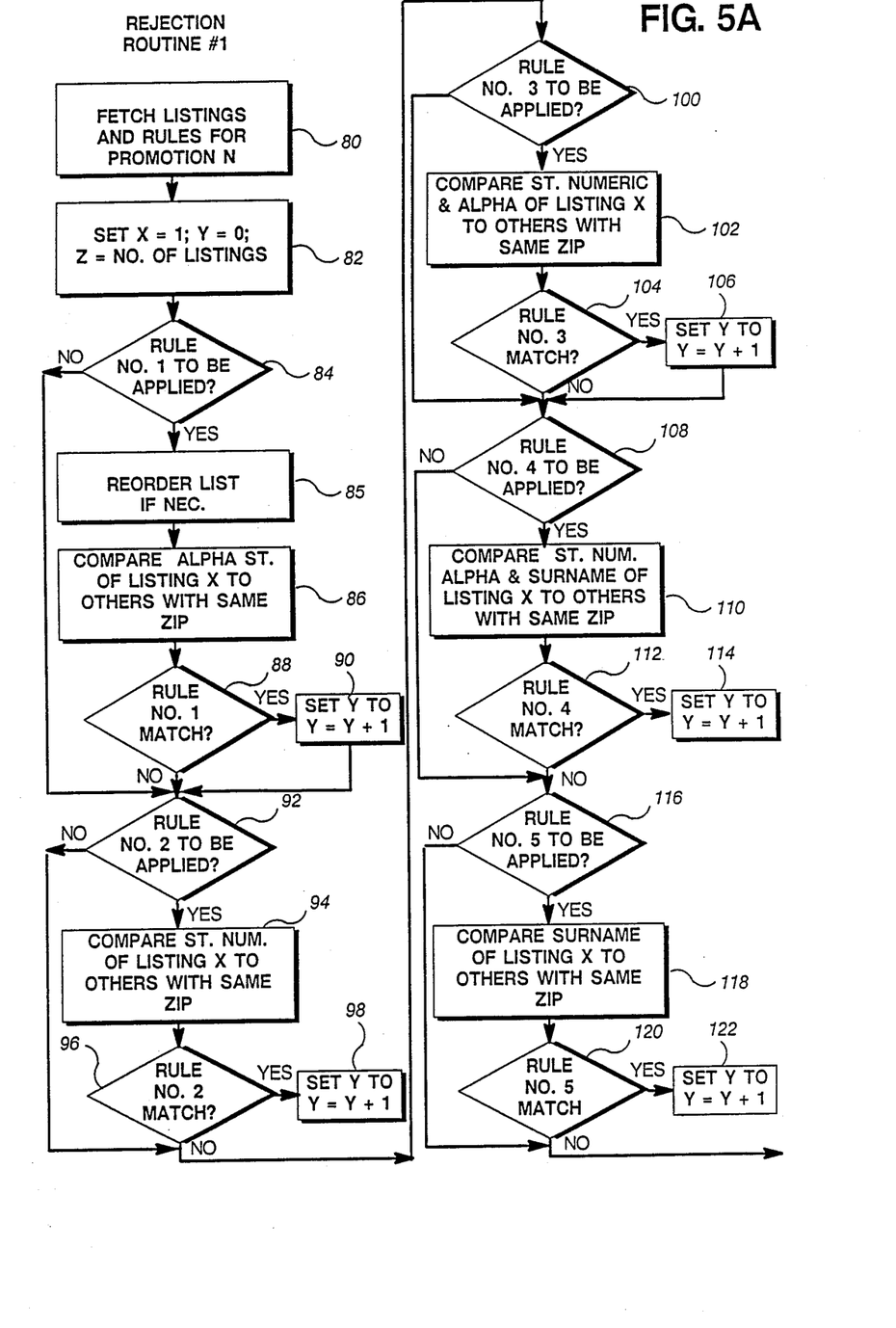
Figure 5B:
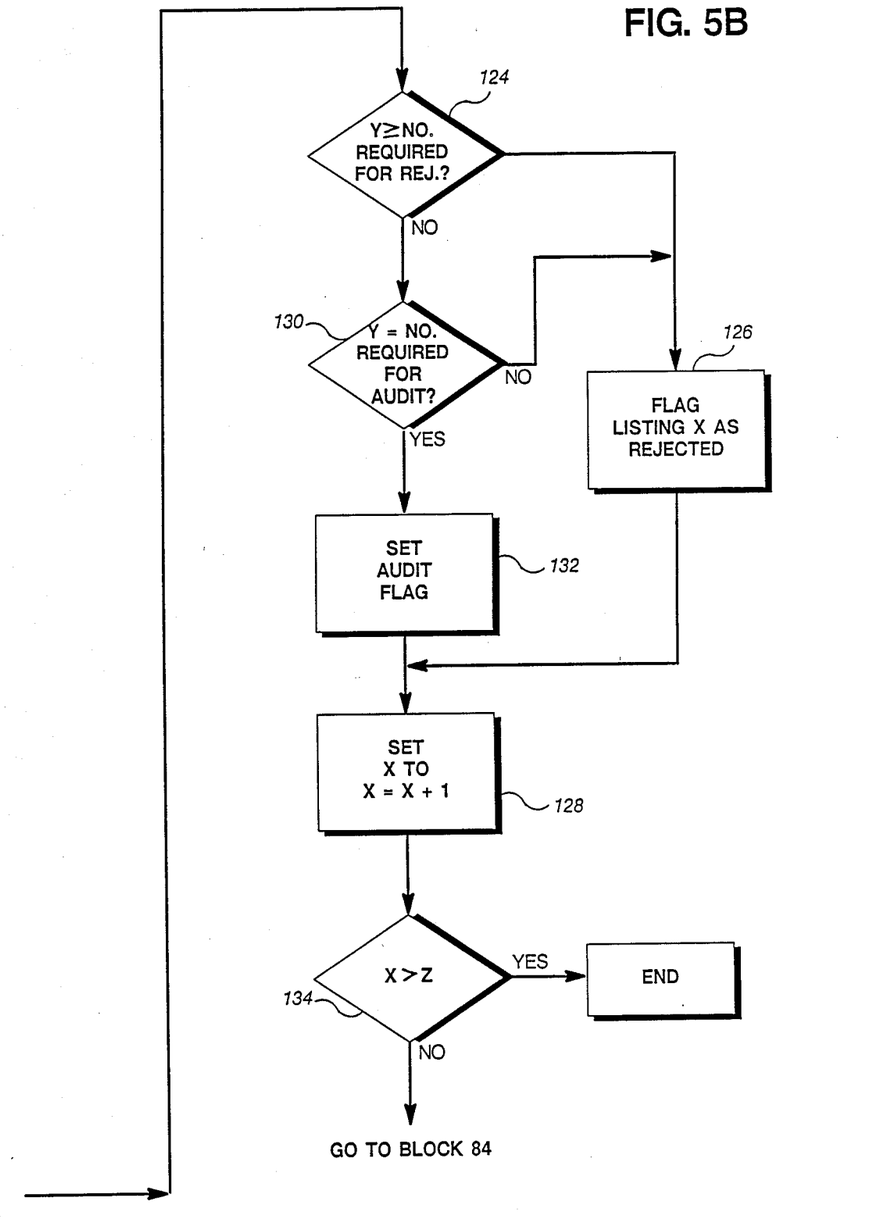
Figure 6:
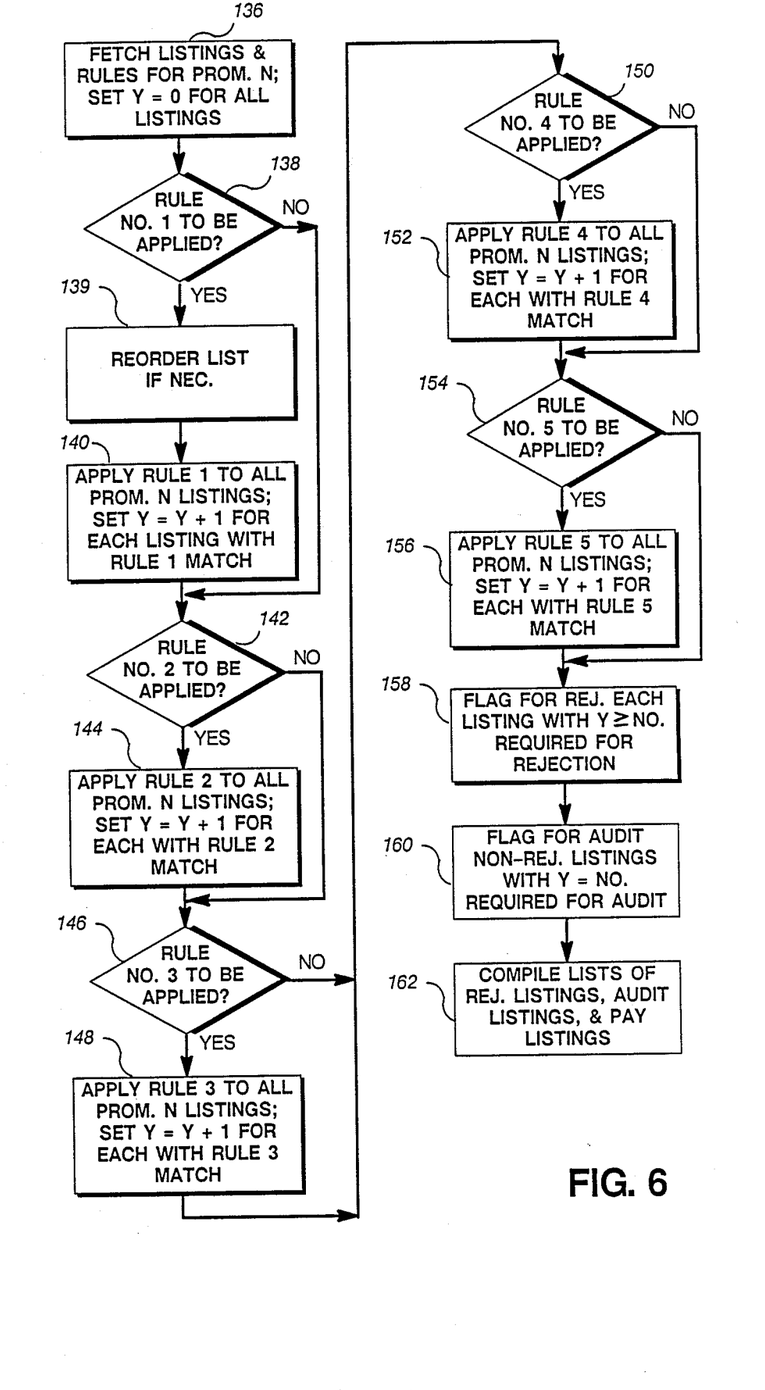
FIG. 6 is a mail listing rejection routine employing cascaded rules.

The rules as depicted in FIGS. 3a and 3b for any given promotion may be applied in series as depicted in FIG. 5 or in a cascaded manner as shown in FIG. 6 depending upon which is the most efficient way to apply the rules. As shown in FIG. 5, to implement a rejection routine in which the rules for a given promotion are applied in series to each listing identified as suspicious by the detector 10, the processor 70 at block 80 first fetches from the pending file 26 those listings identified as suspicious for a given promotion N. At block 80, the processor 70 also fetches those rules from the matrix 74 to be applied for promotion N. The processor 70 at block 82 next sets $X=1$; $Y=0$; and Z equal to the number of listings identified as suspicious for promotion N. If rule 1 is to be applied for promotion N as determined by the processor 70 at block 84, the processor at block 85 reorders the list alphabetically if it is not already so ordered so that the application of rule 1 might be more easily accomplished. Although the list may be reordered before the application of each rule, for simplicity the reordering is shown only at block 86 for rule 1. At block 86 the processor 70 applies rule 1 by comparing the alpha portion of the street address for listing X to the alpha portion of the street address for other listings fetched at block 80 having the same Zip Code as that of listing X. If the processor determines at block 88 that there is a rule 1 match for promotion N, i.e., that a given percentage of the alpha portion of the street address for the listing X matches another listing, the processor 70 at block 90 increments Y to $Y=Y+1$. Thereafter, if rule 2 is to be applied for promotion N as determined by the processor at block 92, at block 94, the processor 70 compares the numeric portion of the street address of listing X to the numeric portion of the street address for other listings associated with the same promotion and having the same Zip Code. If the processor 70 determines at block 96 that there is a rule 2 match, the processor at block 98 increments Y to $Y=Y+1$ and thereafter proceeds to block 100. If rule 3 is to be applied for promotion N as determined by the processor at block 100, the processor 70 at block 102 compares the numeric and alpha portions of the street address for listing X to the street addresses of other listings associated with promotion N having the same Zip Code. If listing X has a given percentage of alpha-numeric characters in its street address in common with those of another listing, a rule 3 match is determined by the processor 70 at block 104 and the processor at block 106 increments Y to $Y=Y+1$. If the processor, at block 108, determines that rule 4 is to be applied for promotion N, the processor at block 110 compares the numeric and alpha portion of the street address as well as the surname of listing X to other listings having the same Zip Code to determine whether the listings have a given percentage of letters and numbers in common. If they do, a rule 4 match is determined by the processor at block 12 and Y is incremented to $Y=Y+1$ at block 114. If the processor at block 116 determines that rule 5 is to be applied for promotion N, the processor 70 at block 118 compares the surname of listing X to the surname of other listings associated with promotion N having the same Zip Code to determine whether listing X has a given percentage of letters in common with another listing. If it does, the processor at block 120 determines a rule 5 match and at block 122, increments Y to $Y=Y+1$.

After applying all of the applicable rules for promotion N, the processor 70, at block 124 determines whether a sufficient number of the rules have been satisfied to justify rejection of the refund request associated with listing X. If the processor at block 124 determines that Y is equal to or greater than the number required for rejection at block 126, the processor 70 flags listing X as rejected and proceeds to a block 128. If the requisite number of rules necessary for rejection were not satisfied as determined by the processor at block 124, the processor at block 130 determines whether Y is sufficient for an audit to be required. An audit might be required, for example, where a listing does not satisfy three rules out of five as required by a promotion for rejection but does satisfy two of the rules. If an audit is to be required as determined by the processor 130, the processor at block 132 sets an audit flag which will result in the listing being highlighted for subsequent review at the auditor's station. Thereafter, at block 128 X is incremented to X=X+1, i.e., to the next listing. If X is less than or equal to Z, the processor 70 returns to block 84 to apply to the next listing each of the rules for promotion N in series.

The processor 70 may also operate according to the rejection routine depicted in FIG. 6 wherein each of the rules is applied in a cascaded manner as follows. At block 136, the processor 70 fetches the listings for promotion N from the pending file 26 as well as the rules for promotion N from the matrix 74. At block 136 the processor 70 also sets Y=0 for all listings. If at block 138 the processor 70 determines that rule 1 is to be applied, the processor at block 139 reorders the list to enable the application of rule 1 to be more easily employed. Although the list may be reordered before the application of each rule, for simplicity the step of reordering is shown only at block 139. At block 140 the processor applies the first rule to all of the listings associated with promotion N, setting Y=Y+1 for each listing satisfying rule 1. Thereafter, if rule 2 is to be applied for promotion N, as determined by the processor at block 142, the processor at block 144 applies rule 2 to all of the promotion N listings. The processor at block 144, while applying rule 2, sets Y=Y+1 for each listing satisfying rule 2. If rule 3 is to be applied as determined by the processor at block 146, the processor 70, at block 148 applies rule 3 to all of the promotion N listings. While applying rule 3 at block 148, the processor 70 sets Y=Y+1 for each listing satisfying rule 3. If rule 4 is to be applied as determined at block 150 by the processor 70, the processor at block 152 applies rule 4 to all of the promotion N listings. While applying rule 4, the processor at block 152 sets Y=Y+1 for each listing satisfying rule 4. Finally, if the processor determines at block 154 that rule 5 is to be applied for promotion N, the processor at block 156 applies rule 5 to the promotion N listings. While applying rule 5, the processor 70 sets Y=Y=+1 for each listing satisfying this rule. At block 158 the processor 70 flags for :ejection each listing having a value of Y greater tan or equal to the number required for rejection. A! block 160 the processor 70 flags for audit each listing not flagged at block 158 and having a value of Y required for an audit. Thereafter, at block 162 the processor 70 compiles a list for rejected listings, a list of listings to be audited and a list of listings to be paid.

Cascaded rules or rules applied in series may be implemented in ways other than those depicted in FIGS. 5 and 6. Further, the rules depicted in FIGS. 3a and 3b are just one example of the various rules which may be applied by the rejector 12 to suspicious listings to identify those which are redundant. A preferred rule set applied by the rejector 12 is depicted in FIG. 7, this rule set being very versatile.

Figure 7:
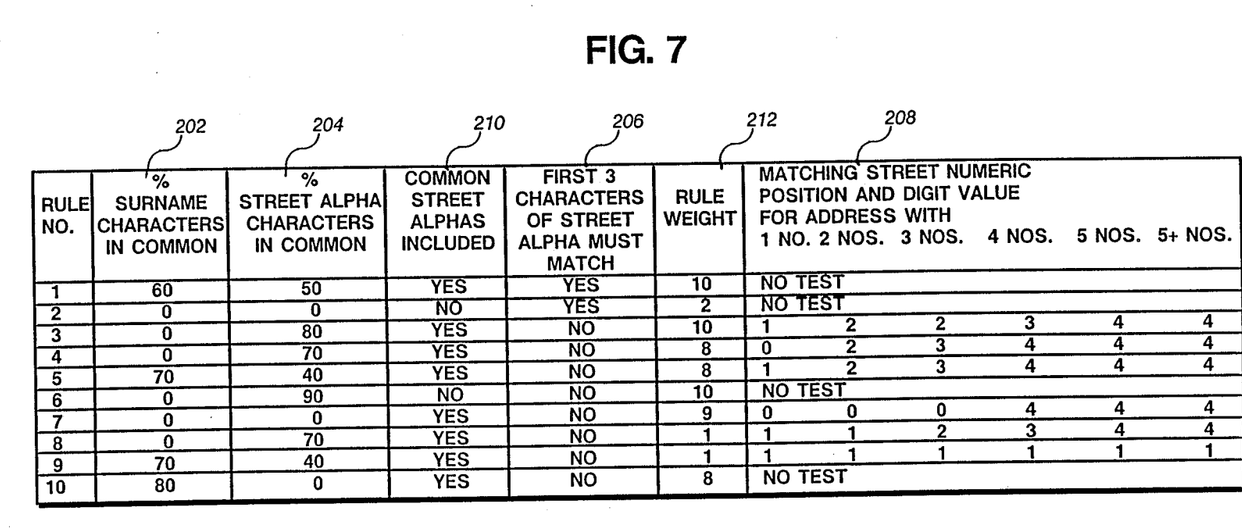
FIG. 7 is a table illustrating the preferred rules utilized by the redundant listing rejector shown in FIGS. 1 and 2.

The rejector 12 utilizes the rule set of FIG. 7 only with respect to previously organized listings having identical zip codes. The rejector 12 applies one or more of the ten rules illustrated to such listings. Each of the ten rules may require the application of one or more of the four tests illustrated in columns 202, 204, 206 and 208. Column 210 identifies the set of listings which are to be compared for a given rule whereas column 212 identifies the weight value associated with each rule as described below. The test of column 202 requires that a given percentage of the characters in the surnames of two listings be in common irrespective of their positions in the surnames. The test of column 204 requires that a given percentage of the characters in the alpha portion of the street addresses of two listings be in common irrespective of their positions. Column 210 specifies whether listings with common street alphas are to be included in the set of listings to which a rule is applied, common street alphas including such common terms as, for example, P.O. Box, RFD, RR, Box, Route, Star Route. Certain rules, such as rules 2 and 6, exclude listings having common street alphas because the occurrence of such common terms weakens these rules. The test of column 206 requires that the first three characters of the alpha portions of the street addresses of two listings match identically. The test of column 208 compares the numeric portions of the street addresses of two listings and concerns the matching of digits for addresses having only one number, two numbers, three numbers, four numbers, five numbers and more than five numbers (5+Nos.).

As shown in FIG. 7, rule 1 requires that two listings, including listings with common street alphas, have 60% of the characters in their surnames in common; 50% of the characters in the alpha portions of their street addresses in common; and an identical match between the first three characters in the alpha portion of their street addresses. If each of the tests of rule 1 are satisfied, the listings accumulate 10 points, the weight for rule 1 being 10 as depicted in column 212.

Rule 2 requires that two listings, excluding those with common street addresses, have an identical match between the first three characters of the alpha portions of their street addresses. If this test is satisfied, 2 points are accumulated, the weight for rule 2 being 2.

Rule 3 requires that two listings, including listings with common street alphas, have 80% of the characters in the alpha portions of their street addresses in common; and with respect to the numeric portions of the street addresses as shown in column 208, for listings with street addresses having one numeric, that number must match identically; for listings with street addresses having two numerics, the two numbers must match identically so that for a given digit the value of the digit for each listing must be the same; for listings with street addresses having three numerics, two out of three of the digits must match identically, i.e., both in numeric value and in numeric address position; for listings with street addresses having four numerics, three out of the four digits must match identically; for listings of street addresses having five numerics, four out of five of the digits must match identically; and for listings with street addresses having more than five numerics, at least four of the digits must match identically. Table I, below, illustrates rule 3 street numeric matches and non-matches for a first listing and a second listing having the given numeric portions of their street addresses.

TABLE I

| STREET NUMERIC PORTION OF ADDRESS | | RULE 3 STREET NO. TEST |
|---|---|---|
| LISTING #1 | LISTING #2 | MATCH |
| 5 | 5 | YES |
| 12 | 12 | YES |
| 12 | 21 | NO |
| 123 | 124 | YES |
| 123 | 132 | NO |
| 1236 | 1246 | YES |
| 1236 | 1263 | NO |

If each of the tests for rule 3 are satisfied, the listings accumulate 10 points, the weight for rule 3 being 10 as depicted in column 212.

Rule 4 requires that two listings including listings with common street alphas have 70% of the characters in the alpha portions of their street addresses in common; and for the numeric portion of the street addresses as shown in column 208; listings with only one numeric need not have the number match; listings with two numerics must have both digits match identically; listings with three numerics must have all three digits match identically; listings with four numerics must have all four digits match identically; and listings with five or more numerics must have at least four of the digits match identically. If both of the tests of rule 4 are satisfied, the listings accumulate 8 points, the weight for rule 4 being 8 as depicted in column 212.

Rule 5 requires that two listings, including listings with common street alphas, have 70% of the characters in their surnames in common; 40% of the characters in the alpha portions of their street addresses in common; and for the numeric portion of the street addresses as shown in column 208; listings with street addresses having one numeric must have that number match identically; listing with street addresses having two numerics must have both digits match identically; listings with street addresses having three numerics must have all three digits match identically; listings with street addresses having four numerics must have all four digits match identically and listings with five or more numerics in their street addresses must have at least four of the digits match identically. If each of the tests of rule 5 are satisfied, the listings accumulate 8 points, the weight for rule 5 being 8 as depicted in column 212.

Rule 6 requires that two listings, excluding those with common street addresses, have 90% of the characters in the alpha portions of their street addresses in common. If this test is satisfied, the listings accumulate 10 points, the weight for rule 6 being 10 as depicted in column 212.

Rule 7 requires that two listings, including listings with common street alphas, have at least four digits in the numeric portions of the street addresses match identically for street addresses with four or more numbers. If this test is satisfied, the listings accumulate 9 points, the weight for rule 7 being 9 as depicted in column 212.

Rule 8 requires that two listings, including listings with common street alphas, have 70% of the characters in the alpha portions of their street addresses in common; and for the numeric portion of the street addresses as shown in column 208: listings with one numeric in the street address must have that number match identically; listings with two numerics in their street addresses must have at least one of the digits match identically; listings with three numerics in their street addresses must have at least two of the digits match identically; listings with four numerics in their street addresses must have at least three of the digits match identically; and listings with five or more numbers must have at least four of the digits matching identically. If each of the tests of rule 8 are satisfied, the listings accumulate 1 point, the weight for rule 8 being 1 as depicted in column 212.

Rule 9 requires that two listings, including listings with common street alphas, have 70% of the characters in their surnames in common; 40% of the characters in the alpha portions of their street addresses in common; and for the numeric portions of the street addresses as shown in column 208 at least one digit matching identically. If each of the tests of rule 9 are satisfied, the listings accumulate 1 point, the weight for rule 9 being 1 as depicted in column 212.

Rule 10 requires that two listings, including listings with common street alphas, have 80% of the characters in their surnames in common. If this test is satisfied, the listings accumulate 8 points, the weight for rule 10 being 8 as depicted in column 212.

The rule weighting depicted in FIG. 7 is the desired weighting where all of the ten rules are applied. Application of all ten rules provides the most comprehensive check, although less than all of the rules may be applied. If less than all ten rules are applied, the weighting for each of the applied rules may be changed accordingly.

After the applicable rule or rules from the set of FIG. 7 are applied, the rejector 12 reviews the points accumulated by each listing and determines whether the refund request associated with each listing should be rejected, audited or paid. If a listing has accumulated 10 points from the satisfaction of one or more rules, the rejector 12 rejects the listing and indicates that the refund request associated with the listing should not be paid. If 1-9 points are accumulated by a listing, the listing is flagged for an audit. If no points are accumulated, the refund request associated with the listing is paid.

Refund requests associated with listings which are not automatically rejected by the processor 70 may still be rejected at the auditor's station 76 (FIG. 2). The auditor's station 76 may include a keyboard 164, a printer 166 and/or a CRT display 168 operated by authorized personnel. By means of the keyboard 164, the printer 166 or CRT display 168 may be controlled to print/display those listings identified as suspicious by the detector 10 but not rejected by the processor 70. For convenience, the list may be marked to highlight specific listings of interest such as where the audit flag has been set as discussed with reference to FIG. 5. The auditor's station 76 allows an operator to identify scams which would otherwise go undetected.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A system for purifying a mailing list to protect against redundant mailings, said mailing list having a plurality of listings comprising:
   automated means for identifying suspicious listings in said mailing list according to a first statistically significant event; and
   automated redundant listing identifying means for analyzing said suspicious listings according to a second statistically significant event to identify redundant mailings.

2. A system for purifying a mailing list as recited in claim 1 further including means for storing first data indicative of listings previously identified as suspicious, said suspicious listing identifying means including automated means for comparing second data indicative of a listing in said mailing list to said first data in said storage means according to at least one rule defining said first statistically significant event.

3. A system for purifying a mailing list as recited in claim 1 further including means for storing first data indicative of listings for persons known to have had multiple listings, said suspicious listing identifying means including automated means for comparing second data indicative of a listing in said mailing list to said first data according to one or more rules defining said first statistically significant event.

4. A system for purifying a mailing list as recited in claim 1 further including means for storing a plurality of rules, each rule defining a second statistically significant event; and automated means for selecting at least one of said rules, said redundant listing identifying means being responsive to said selecting means for automatically applying selected rules to listings identified as suspicious to identify redundant mailings.

5. A system for purifying a mailing list as recited in claim 1 wherein said redundant listing identifying means includes means for comparing listings according to a plurality of rules including one rule requiring a given percentage of letters in a portion of one listing to be in common with the letters in a corresponding portion of a second listing.

6. A system for purifying a mailing list as recited in claim 1 wherein said redundant listing identifying means includes means for comparing listings according to a plurality of rules including one rule requiring a given percentage of numbers in a portion of one listing to be in common with the numbers in a corresponding portion of a second listing.

7. A system for purifying a mailing list as recited in claim 1 wherein said redundant listing identifying means includes means for comparing listings according to a plurality of rules in series.

8. A system for purifying a mailing list as recited in claim 1 wherein said redundant listing identifying means includes means for comparing listings according to a plurality of cascaded rules.

9. A system for purifying a mailing list as recited in claim 1 wherein each of said listings includes a surname and said suspicious listing identifying means includes means for comparing the first N letters of surname of a first listing, N being an integer, with the first N letters of surname of a second listing having a Zip Code the same as a Zip Code of said first listing, said first listing being identified as suspicious if the first N letters of the surnames of said listings match.

10. A system for purifying a mailing list as recited in claim 1 wherein each of said listings includes a street address and said suspicious listing identifying means includes means for comparing the first N numbers of a street address for a first listing, N being an integer, with the first N numbers of a street address for a second listing having a Zip Code the same as a Zip Code of said first listing, said first listing being identified as suspicious if the first N numbers of the street addresses of said listings match.

11. A system for purifying a mailing list as recited in claim 1 wherein each of said listings includes a surname and said redundant listing identifying means includes means for comparing the letters of a surname of a first listing with the letters of a surname of a second listing having a Zip Code the same as a Zip Code of said first listing, said first and second listings being identified as redundant if at least a given percentage of the letters in the surname of the first listing are in common with the letters in the surname of the second listing.

12. A system for purifying a mailing list as recited in claim 1 wherein each of said listings includes a street address and said redundant listing identifying means includes means for comparing the letters of the street address for a first listing to the letters of a street address for a second listing having a Zip Code the same as a Zip Code of said first listing, said first and second listings being identified as redundant if at least a given percentage of the letters in the street address of the first listing are in common with the letters in the street address of the second listing.

13. A system for purifying a mailing list as recited in claim 1 wherein each of said listings includes a street address and said redundant listing identifying means includes means for comparing the first an numbers of a street address of a first listing with the first N numbers of a street address of a second listing having a Zip Code the same as a Zip Code of said first listing, said first an second listings being identified as redundant if X out of the N numbers of the street addresses for said first and second listings match wherein X and N are integers with X being no greater than N.

14. A system for purifying a mailing list as recited in claim 1 wherein each of said listings includes a street address having at least one number and letters and said redundant listing identifying means includes means for comparing the street address of a first listing to the street address of a second listing having a Zip Code the same as a Zip Code of the first listing, said first and second listings being identified as redundant if at least a given percentage of a total of the numbers and letters in the street address of the first listing are in common with the numbers and letters in the street address of the second listing.

15. A system for purifying a mailing list as recited in claim 1 wherein each of said listings includes a surname having letters and a street address having at least one number and letters and said redundant listing identifying means includes means for comparing the surname and street address of a first listing with the surname and street address of a second listing having a Zip Code the same as a Zip Code of the first listing, said first and second listings being identified as redundant if at least a given percentage of a total of the numbers and letters in the surname and street address of the first listing are in common with the numbers and letters in the surname and street address of the second listing.

16. A refund promotion monitoring system for identifying redundant refund requests in a refund request mail listing compilation comprising:
   automated means for identifying suspicious listings in said compilation according to at least one first statistically significant event; and
   automated redundant listing identifying means for analyzing said suspicious listings according to at least one second statistically significant event to identify redundant refund requests.

17. A refund promotion monitoring system for identifying redundant refund requests as recited in claim 16 further including means for storing first data indicative of listings previously identified as suspicious, said suspicious listing identifying means including means for comparing second data indicative of a listing to said first data according to at least one rule defining said first statistically significant event.

18. A refund promotion monitoring system for identifying redundant refund requests as recited in claim 16 further including a means for storing first data indicative of listings for persons known to be abusers of refund promotions, said suspicious listing identifying means including means for comparing second data indicative of a listing currently being processed by said system to said first data according to at least one rule defining said first statistically significant event.

19. A refund promotion monitoring system for identifying redundant refund requests as recited in claim 16 further including means for storing a plurality of rules, each rule defining a statistically significant event; and automated means for selecting at least one of said rules, said redundant listing identifying means being responsive to the selection of one or more rules by said selecting means for applying said at least one rule to listings previously identified as suspicious to identify redundant refund requests.

20. A refund promotion monitoring system for identifying redundant refund requests as recited in claim 16 wherein said redundant listing identifying means includes means for comparing listings according to a plurality of rules including one rule requiring a given percentage of letters in a portion of one listing to be in common with the letters in a corresponding portion of a second listing.

21. A refund promotion monitoring system for identifying redundant refund requests as recited in claim 16 wherein said redundant listing identifying means includes means for comparing listings according to a plurality of rules including one rule requiring a given percentage of numbers in a portion of one listing to be in common with the numbers in a corresponding portion of a second listing.

22. A refund promotion monitoring system for identifying redundant refund requests as recited in claim 16 wherein said redundant listing identifying means includes means for comparing listings according to a plurality of rules, said comparison means applying to a listing each of said rules in series.

23. A refund promotion monitoring system for identifying redundant refund requests as recited in claim 16 wherein said redundant listing identifying means includes means for comparing listings according to a plurality of cascaded rules.

24. A refund promotion monitoring system for identifying redundant refund requests as recited in claim 16 wherein each of said listings includes a surname and said suspicious listing identifying means includes means for comparing the first N letters of a surname of a first listing, N being an integer, with the first N letters of a surname of a second listing having a Zip Code the same as a Zip Code of said first listing, said first listing being identified as suspicious if the first N letters of the surnames of said listings match.

25. A refund promotion monitoring system for identifying redundant refund requests as recited in claim 16 wherein each of said listings includes a street address and said suspicious listing identifying means includes means for comparing the first N numbers of a street address for a first listing, N being an integer, with the first N numbers of a street address for a second listing having a Zip Code the same as a Zip Code of said first listing, said first listing being identified as suspicious if the first N numbers of the street addresses of said listings match.

26. A refund promotion monitoring system for identifying redundant refund requests as recited in claim 16 wherein each of said listings includes a surname and said redundant listing identifying means includes means for comparing the letters of a surname of a first listing with the letters of a surname of a second listing having a Zip Code the same as a Zip Code of said first listing, said first and second listings being identified as redundant refund requests if at least a given percentage of the letters in the surname of the first listing are in common with the letters in the surname of the second listing.

27. A refund promotion monitoring system for identifying redundant refund requests as recited in claim 16 wherein each of said listings includes a street address and said redundant listing identifying means includes means for comparing the letters of the street address for a first listing to the letters of a street address for a second listing having a Zip Code the same as a Zip Code of said first listing, said first and second listings being identified as redundant refund requests if at least a given percentage of the letters in the street address of the first listing are in common with the letters in the street address of the second listing.

28. A refund promotion monitoring system for identifying redundant refund requests as recited in claim 16 wherein each of said listings includes a street address and said redundant listing identifying means includes means for comparing the first N numbers of a street address of a first listing with the first N numbers of a street address of a second listing having a Zip Code the same as a Zip Code of said first listing, said first and second listings being identified as redundant refund requests if X out of the N numbers of the street addresses for said first and second listings match wherein X and N are integers with X being no greater than N.

29. A refund promotion monitoring system for identifying redundant refund requests as recited in claim 16 wherein each of said listings includes a street address having at least one number and letters and said redundant listing identifying means includes means for comparing the street address of a first listing to the street address of a second listing having a Zip Code the same as a Zip Code of the first listing, the refund requests of said first and second listings being identified as redundant requests if at least a given percentage of a total of the numbers and letters in the street address of the first listing are in common with the numbers and letters in the street address of the second listing.

30. A refund promotion monitoring system for identifying redundant refund requests as recited in claim 16 wherein each of said listings includes a surname having letters and a street address having at least one number and letters and said redundant listing identifying means includes means for comparing the surname and street address of a first listing with the surname and street address of a second listing having a Zip Code the same as a Zip Code of the first listing, said first and second listings being identified as redundant fund requests if at least a given percentage of a total of the numbers and letters in the surname and street address of the first listing are in common with the numbers and letters in the surname and street address of the second listing.

31. A refund promotion monitoring system for identifying redundant refund requests as recited in claim 16 wherein said suspicious listing identifying means includes means for comparing first data indicative of a first listing for a refund request received in a given time period for a first promotion to second data indicative of a second listing for a refund request received in said given time period for a different promotion according to at least one rule defining said first statistically significant event.

32. A refund promotion monitoring system for identifying redundant refund requests as recited in claim 31 wherein said time period is one day.

33. A refund promotion monitoring system for identifying redundant refund requests as recited in claim 31 further including means for storing first data indicative of listings identified as suspicious during a previous time period, said suspicious listing identifying means including means for comparing second data indicative of a listing in said compilation to said first data according to said at least one rule.

34. A refund promotion monitoring system for identifying redundant refund requests by a submitting entity with each request having an associated mail listing in a refund request mail listing compilation comprising:
automated means for processing refund requests received for a plurality of promotions;
said processing means including automated means for comparing a first listing for a refund request received for a first promotion in a time period to a second listing for a refund request received in said time period for a different promotion to determine whether the refund requests of the first and second listings are associated with the same submitting entity.

35. A refund promotion monitoring system for identifying redundant refund requests as recited in claim 34 wherein said time period is one day.

36. A refund promotion monitoring system for identifying redundants refund requests as recited in claim 34 further including means for storing data indicative of listings for refund requests received during a previous time period wherein said processing means further includes means for comparing said first data indicative of said first listing with second data indicative of other listings in said storage means to determine whether said first listing and another listing are for refund requests from the same submitting entity.

37. A refund promotion monitoring system for identifying redundant refund requests as recited in claim 34 further including means for storing first data indicative of listings for persons known to be abusers of refund promotions, wherein said processing means further including means for comparing data indicative of said first listing to said first data to determine whether said first listing is associated with one of said known abusers.

38. A refund promotion monitoring system for identifying redundant refund requests as recited in claim 34 wherein each of said listings includes a surname and said comparing means includes means for comparing the first N letters of a surname of a first listing, N being an integer, with the first N letters of a surname of a second listing having a Zip Code the same as a Zip Code of said first listing, said first and second listings being identified as suspicious if the first N letters of the surnames of said first and second listings match.

39. A refund promotion monitoring system for identifying redundant refund requests as recited in claim 34 wherein each of said listings includes a street address and said comparing means includes means for comparing the first N numbers of street address for a first listing, N being an integer, with the first N numbers of a street address for a second listing having a Zip Code the same as a Zip Code of said first listing, said first and second listings being identified as suspicious if the first N numbers of the street addresses of said first and second listings match.

40. A refund promotion monitoring system for identifying redundant refund requests, each of said requests having an associated mail listing formed of alphanumeric characters in a refund request mail listing compilation, comprising:
automated means for processing refund requests according to a plurality of rules to identify redundant requests;
said processing means including automated means for comparing a portion of a first mail listing to a corresponding portion of a second mail listing to determine whether a given percentage of the characters in said portion of said first mail listing are in common with characters in the corresponding portion of said second mail listing.

41. A refund promotion monitoring system for identifying redundant refund requests, by one person, each of said requests having an associated mail listing in a refund request mail listing compilation, comprising:
automated means for processing refund requests to identify redundant refund requests;
said processing means including means for comparing one mail listing to other mail listings according to a plurality of rules, said comparing means applying each of said rules in series; and means responsive to said comparing means for identifying a mail listing as redundant if a predetermined number of said rules are satisfied.

42. A refund promotion monitoring system for identifying redundant refund requests, each of said requests having an associated mail listing in a refund request mail listing compilation, comprising:
automated means for processing refund requests to identify multiple requests;
said processing means including means for comparing mail listings according to a plurality of cascaded rules, said comparing means applying one rule to a group of mail listings and thereafter applying a second cascaded rule to at least a portion of said group of mail listings; and means responsive to said comparing means for identifying a mail listing as redundant if a predetermined number of said rules are satisfied.

43. A refund promotion monitoring system for identifying redundant refund requests, each of said requests having an associated mail listing formed of alphanumeric characters in a refund requests mail listing compilation, comprising:
automated means for comparing portions of a first mail listing to corresponding portions of a second mail listing according to a plurality of weighted rules to determine whether said rules are satisfied;
means responsive to said comparing means for accumulating for each mail listing a number of points for satisfying a rule, the number of points accumulated for the satisfaction of a given rule corresponding to the weight of said rule; and means responsive to the number of points accumulated for each listing for rejecting a refund request associated with a mail listing having at least a given number of accumulated points.

44. A refund promotion monitoring system for identifying redundant refund requests as recited in claim 43 further including means responsive to the points accumulated for each mail listing for flagging for an audit a mail listing with accumulated points, the number of which is less than said given number.

45. A refund promotion monitoring system for identifying redundant refund requests as recited in claim 43 wherein said automated comparing means includes means for comparing a portion of said first listing to a corresponding portion of said second listing to determine whether a given percentage of the characters in said portion of said first listing are in common with characters in the corresponding portion of said second listing.

46. A refund promotion monitoring system for identifying redundant refund requests as recited in claim 43 wherein said automated comparing means includes means for comparing the most significant characters in a portion of said first listing with the most significant characters in a corresponding portion of said second listing to determine whether said characters match identically.

47. A refund promotion monitoring system for identifying redundant refund requests as recited in claim 43 wherein said automated comparing means includes means for comparing digits in a numeric portion of said first listing with digits in a corresponding numeric portion of said second listing to determine whether a given number of said digits match.

48. A method for monitoring a refund promotion to identify redundant refund requests, each of said requests having an associated mail listing, comprising:
   compiling a list of mail listings associated with refund requests received during a first period of time for a plurality of different refund promotions;
   comparing each listing in said list to other listings in said list according to at least one first rule defining a first statistically significant event to determine whether the receipt of the refund request associated with each listing is statistically significant;
   storing in a file listings associated with refund requests determined during said comparing step to be statistically significant; and
   comparing said listings stored in said file according to at least one second rule defining a second statistically significant event to determine whether said listings are associated with redundant refund requests.

49. A method for monitoring a refund promotion to identify redundant refund requests as recited in claim 48 further including the step of ordering said list of mailings compiled during said first period of time according to a first characteristic of said listings to allow said at least one first rule defining said first statistically significant event to be more easily applied.

50. A method for monitoring a refund promotion to identify redundant refund requests as recited in claim 48 further including the step of comparing a first listing in said list to listings previously identified as suspicious according to at least one rule defining a statistically significant event to determine whether the receipt of the refund request associated with said first listing is statistically significant.

51. A method for monitoring a refund promotion to identify redundant refund requests as recited in claim 48 further including the step of comparing a first listing in said list to listings of known abusers according to at least one rule defining a statistically significant event to determine whether the receipt of the refund request associated with said first listing is statistically significant.

52. A method for monitoring a refund promotion to identify redundant refund requests as recited in claim 48 wherein said step of comparing listings to identify redundant refund requests includes the steps of:
   comparing a first listing to other listings according to a first rule; and
   comparing said first listing to other listings according to a second rule applied in series with said first rule.

53. A method for monitoring a refund promotion to identify redundant refund requests as recited in claim 48 wherein said step of comparing listings to identify redundant refund requests includes the steps of applying a first rule to a group of listings and thereafter applying a second cascaded rule to at least a portion of the same group of listings.

54. A method for monitoring a refund promotion to identify redundant refund requests as recited in claim 53 further including the step of ordering, prior to applying said first rule, said group of listings according to a first characteristic of said listings to allow the first rule to be more easily applied.

55. A method for monitoring a refund promotion to identify redundant refund requests as recited in claim 54 further including the step of reordering according to a second characteristic of said listings at least a portion of said group of listings prior to applying the second rule to allow the second rule to be more easily applied.

* * * * *